US011126554B2

(12) United States Patent
Vakharwala et al.

(10) Patent No.: US 11,126,554 B2
(45) Date of Patent: Sep. 21, 2021

(54) PREFETCHING WRITE PERMISSIONS INTO ADDRESS TRANSLATION CACHE

(71) Applicant: Intel Corporation, Santa Clara, CA (US)

(72) Inventors: Rupin H. Vakharwala, Hillsboro, OR (US); Paula Petrica, Portland, OR (US)

(73) Assignee: Intel Corporation, Santa Clara, CA (US)

(*) Notice: Subject to any disclaimer, the term of this patent is extended or adjusted under 35 U.S.C. 154(b) by 91 days.

(21) Appl. No.: 16/361,512

(22) Filed: Mar. 22, 2019

(65) Prior Publication Data

US 2019/0220413 A1 Jul. 18, 2019

(51) Int. Cl.
*G06F 12/00* (2006.01)
*G06F 12/0862* (2016.01)
*G06F 13/42* (2006.01)
*G06F 12/1036* (2016.01)

(52) U.S. Cl.
CPC .......... *G06F 12/0862* (2013.01); *G06F 12/00* (2013.01); *G06F 12/1036* (2013.01); *G06F 13/42* (2013.01); *G06F 2213/0026* (2013.01)

(58) Field of Classification Search
None
See application file for complete search history.

(56) References Cited

U.S. PATENT DOCUMENTS 9,063,891 B2 * 6/2015 Kegel ................. G06F 12/1441
9,189,441 B2 * 11/2015 Guddeti ................. G06F 13/14
2021/0149815 A1 * 5/2021 Gayen ..................... G06F 12/10

* cited by examiner

*Primary Examiner* — Midys Rojas
(74) *Attorney, Agent, or Firm* — Alliance IP, LLC

(57) ABSTRACT

Systems, methods, and devices can include circuitry or computer program products to receive a memory address translation request message from a downstream connected device; identify, from the memory address translation request message, a permission indication that the device intends to perform a write access to one or more memory address locations specified in the memory address translation request message; identify, from an address translation and protection table (ATPT), a dirty bit value associated with the one or more memory address locations; and transmit a translation of the one or more memory address locations and a read or read+write permission to the device based on the permission indication in the memory address translation request message and the dirty bit.

25 Claims, 11 Drawing Sheets

PREFETCHING WRITE PERMISSIONS INTO ADDRESS TRANSLATION CACHE

BACKGROUND

Accelerators are a type of connected device or endpoint that can offload general purpose processing and execute certain workloads more efficiently in terms of performance and power. Address virtualization capabilities allow for scalable, robust use of accelerators, address virtualization capabilities. An operating system can manage virtual address spaces and the assignment of real memory to virtual memory. Address translation hardware in the central processing unit, often referred to as a memory management unit or MMU, can translate virtual addresses to physical addresses, and vice versa.

DETAILED DESCRIPTION

Figure 1:
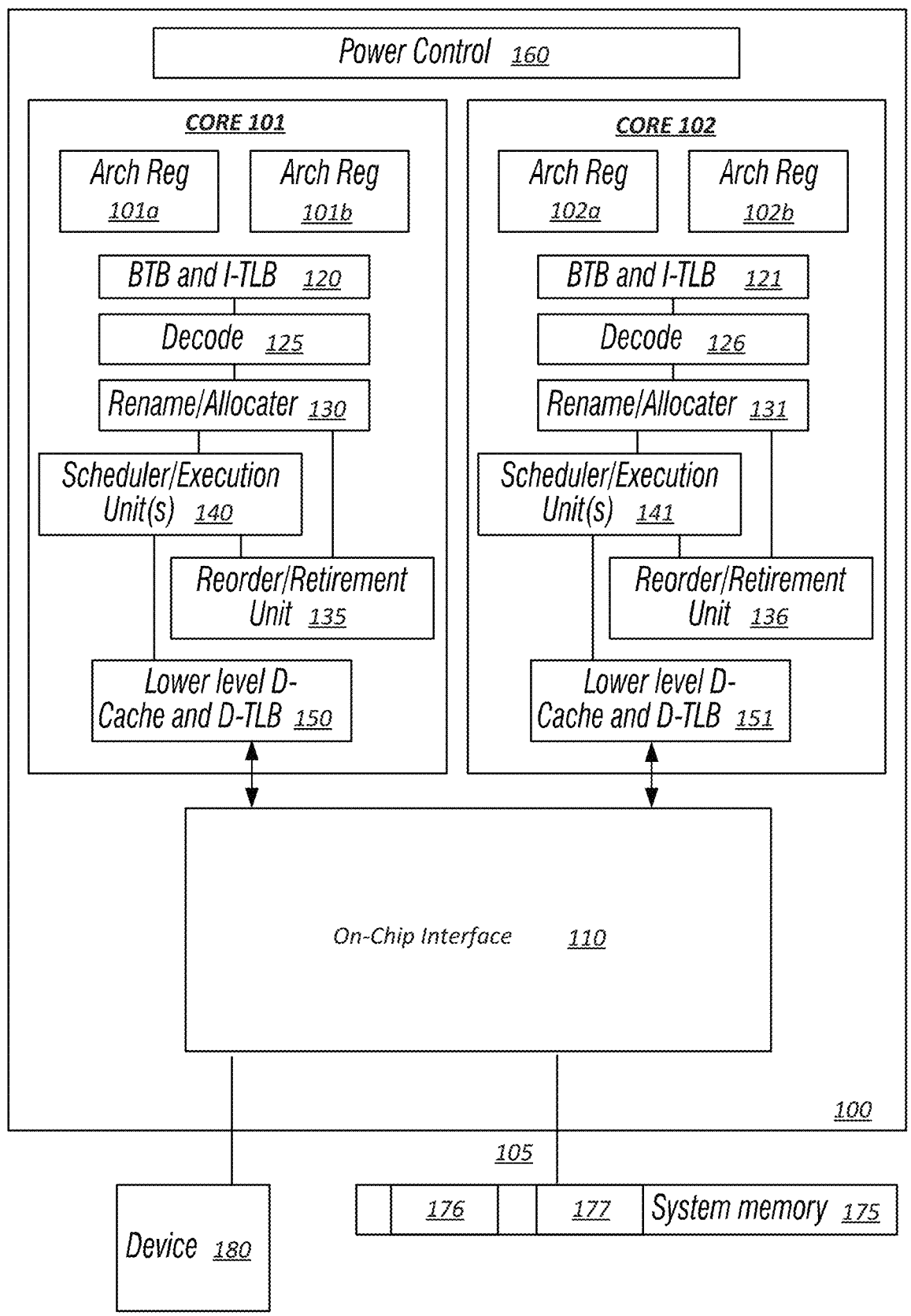
FIG. 1 illustrates an embodiment of a block diagram for a computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it is a singular purpose of most fabrics to provide highest possible performance with maximum power saving. Below, a number of interconnects are discussed, which would potentially benefit from aspects of the disclosure described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores-core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Process Address Space ID (PASID) allows multiple software processes to operate within their own unique address space without unwanted accesses by other processes. To achieve this, platform infrastructure manages translating Virtual Addresses (VAs) from various address spaces to system memory Physical Addresses (PAs). Address Translation Services (ATS) can optimize the management of translations. A device can store translations (PAs) in an Address Translation Cache (ATC), and then issue translated addresses rather than untranslated addresses to access the rest of the system.

The PCIe Address Translation Services (ATS) specification allows devices to request read or read+write permissions in an Address Translation Request message. When a device requests a read permission for one or more addresses, the Translation Agent (TA) can provide the read request without additionally granting a write request permission even if such write permissions are present and available for the device. Therefore, a device that later needs write permissions for the same addresses would send a second Address Translation Request message requesting for read+write permission to get the write permission from the TA that were available earlier.

This disclosure describes a technique by which a device can request and, possibly receive, a read+write request using a single Address Translation Request message. In some instances, the device can have an indication that the device will write to the addresses in the Address Translation Request message. The device can set a flag in the Address Translation Request message, hereinafter referred to as a Potential Write (PW) flag. A device can set the PW flag in the Address Translation Request message, which signals to the TA that the device is anticipating a write request, and is requesting write permission from the TA. When TA receives such a request, if a dirty bit (or modified bit) in the page tables (e.g., Address Translation and Protection Table) is already set for the page, the TA will treat the request like existing Address Translation Request message with the No Write (NW) flag cleared (e.g., NW flag having a value of 0, indicating read+write); if the dirty bit is clear, then the TA will treat the request in a similar manner of an existing Translation Request with NW flag set (e.g., NW flag set to a value of 1, indicating no write).

This disclosure describes a technique by which a device can eliminate one Address Translation Request when the device is unsure if the page the device is reading currently would be written to in the future. Devices can set existing No Write (NW) flag in an Address Translation Request message to request read (NW=1) or read+write (NW=0) permissions based on the device's current needs. However, when a device knows that it only needs read permission currently and is not sure if the device will need write permission in the future, the device can use a flag termed Potential Write (PW) described herein. When the TA receives a request with the PW flag set, the TA will treat the request like existing Address Translation Request message with the No Write (NW) flag Cleared if the dirty bit (or modified bit) in the page tables (e.g., Address Translation and Protection Table) is already set for the page. The TA will treat a request with the PW flag set as existing Address Translation Request message with the No Write (NW) flag Set if the dirty bit in the page tables is not set.

Figure 2:
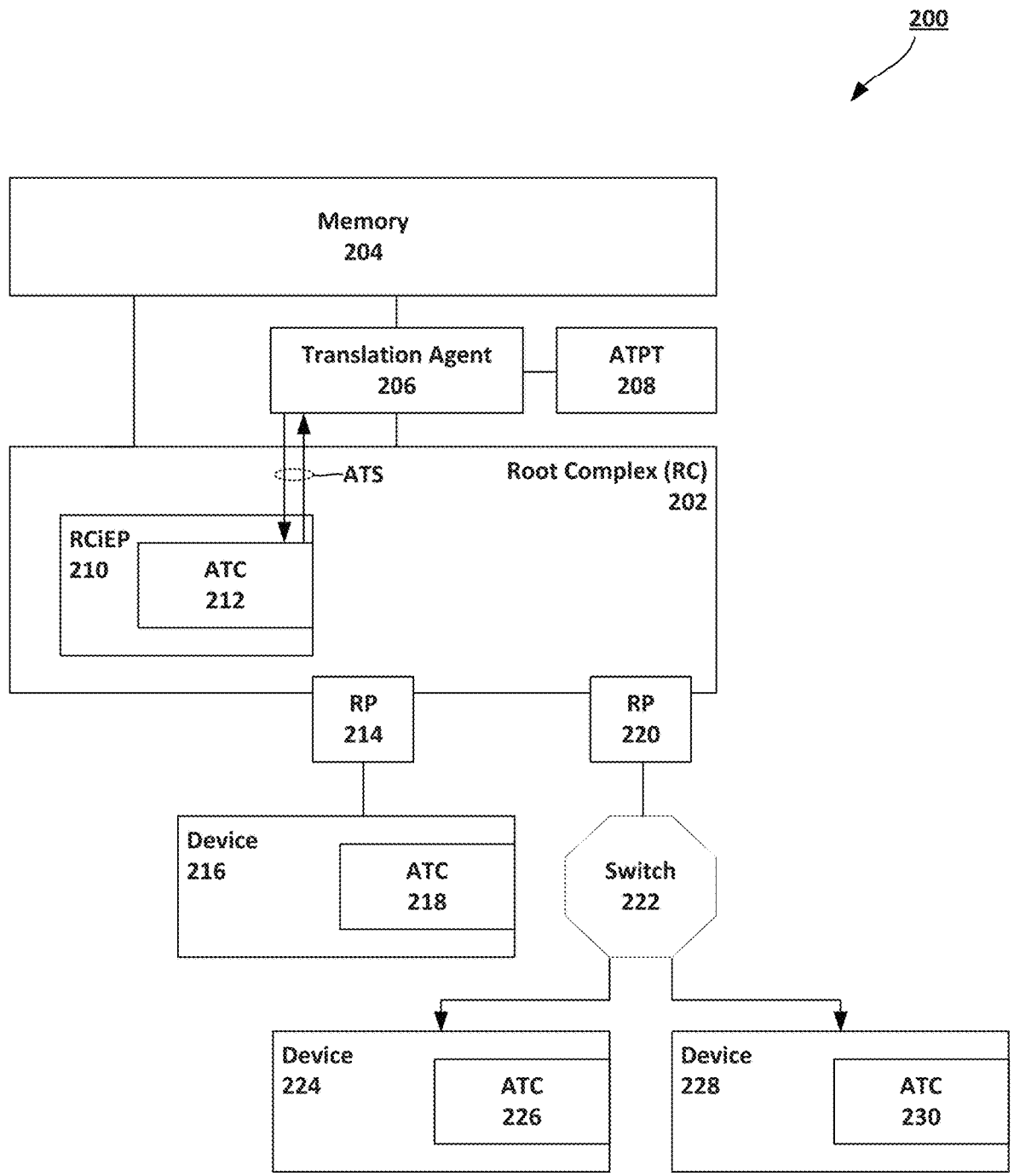
FIG. 2 is a schematic diagram of an example computer system that includes an address translation agent in accordance with embodiments of the present disclosure.

FIG. 2 is a schematic diagram of an example computer system 200 that includes an address translation agent in accordance with embodiments of the present disclosure. The system 200 includes a root complex (RC) 202 (e.g., PCIe RC) or other type of device hosting system (e.g., PCI bridge). The RC 202 connects a processor and memory subsystem (e.g., memory 204) to one or more devices, such as device 216 coupled to the RC 202 by a root port (RP) 214 and a multi-lane link. The RC 202 can include a root complex integrated endpoint (RCiEP) 210. In some embodiments, a switch fabric 222 can be coupled to the RC 202 via an RP 220 across a multi-lane link. The switch fabric 222 can be coupled to one or more devices (224, 228) across a multi-lane link to connect the devices 224 and 228 to the RC 202.

The RC 202 is coupled to a memory subsystem 204. Memory subsystem 204 can be system memory for a host system, shared memory, other accessible memory. The memory subsystem 204 can be used by the one or more devices for memory transactions, such as reads and writes, to execute jobs tasked by the host system.

The system 200 also includes an address translation agent 206 coupled to an address translation and protection table (ATPT) 208. The address translation agent 206 can include hardware circuitry, software, or a combination of hardware and software. The address translation agent 206 and the ATPT 208 can be used to provide address translation services (ATS) for address spaces in the memory subsystem 204 to allow one or more of the devices to perform memory transactions to satisfy job requests issued by the host system. PCIe Address Translation Service (ATS) allows devices to cache translation in Address Translation Cache (ATC) and later re-use them to improve performance. In FIG. 2, RCiEP 210 is illustrated to be performing address translation services with the translation agent 206.

The RCiEP 210 and devices 216, 224, and 228 can be devices that are compliant with an interconnect protocol, such as PCIe. Examples of devices include accelerators, disk controller, network controller, graphics controller, or other type of device that is involved in streaming workloads. Each of RCiEP 210 and devices 216, 224, and 228 can include a address translation cache (ATC) 212, 218, 226, and 230, respectively. The address translation caches (ATCs) can include an indexed random access memory for storing a mapping between virtual addresses and physical addresses, and can index the mapping. Other types of memory can be used for the ATC. The ATC can be considered a memory element that has one or more memory element locations or entries, and each memory element location can be indexed. An index value can point to a memory element location that is allocated for or contains a VA and PA translation.

The root complex 202, root ports 214 and 220, switch fabric 222, and the links can be compliant with the PCIe protocol. Other interconnect protocols are also within the scope of the disclosure.

Accelerator device workloads may be generalized as involving reading data from memory, processing that data, and then writing the processed data back to memory. With the addition of ATS, the device manages the translation of provided Virtual Addresses (VAs) to Physical Addresses (PAs). To read from memory, the device first translates (or requests translation of) the provided VA to a PA and then uses that translated PA to perform a memory read. Similarly, in order to write to memory the device must also first translate the provided VA to a PA and then use that translated PA to write to memory.

VA can include any untranslated address including Virtual Address, Guest Physical Address, Input Output Virtual Address, etc. PASID should be understood to potentially be a part of the VA when the term VA is used in this document. PA translation can include a PA translation of a requested VA, but can also include permissions (fulfilled by ATPT 208). Stored in the ATC are not only the VA and PA, but also the permissions that were returned along with the PA. Similarly, the ATC receives permissions along with the PA translation (such as read only, read+write, etc. permissions).

In embodiments, a device, such as any of the devices 210, 216, 224, or 228, can indicate in an Address Translation Request message that a write command to indicated addresses is forthcoming. The indication can cause a translation agent 206 to respond to the Address Translation Request message with the appropriate address translations, and if appropriate, the permissions requested for in the Address Translation Request message. In some embodiments, a flag in the Address Translation Request message can be set to indicate the potential write (PW). For example, in a 64 bit Translation Request message can be used, which is shown in more detail in FIG. 3.

Figure 3:
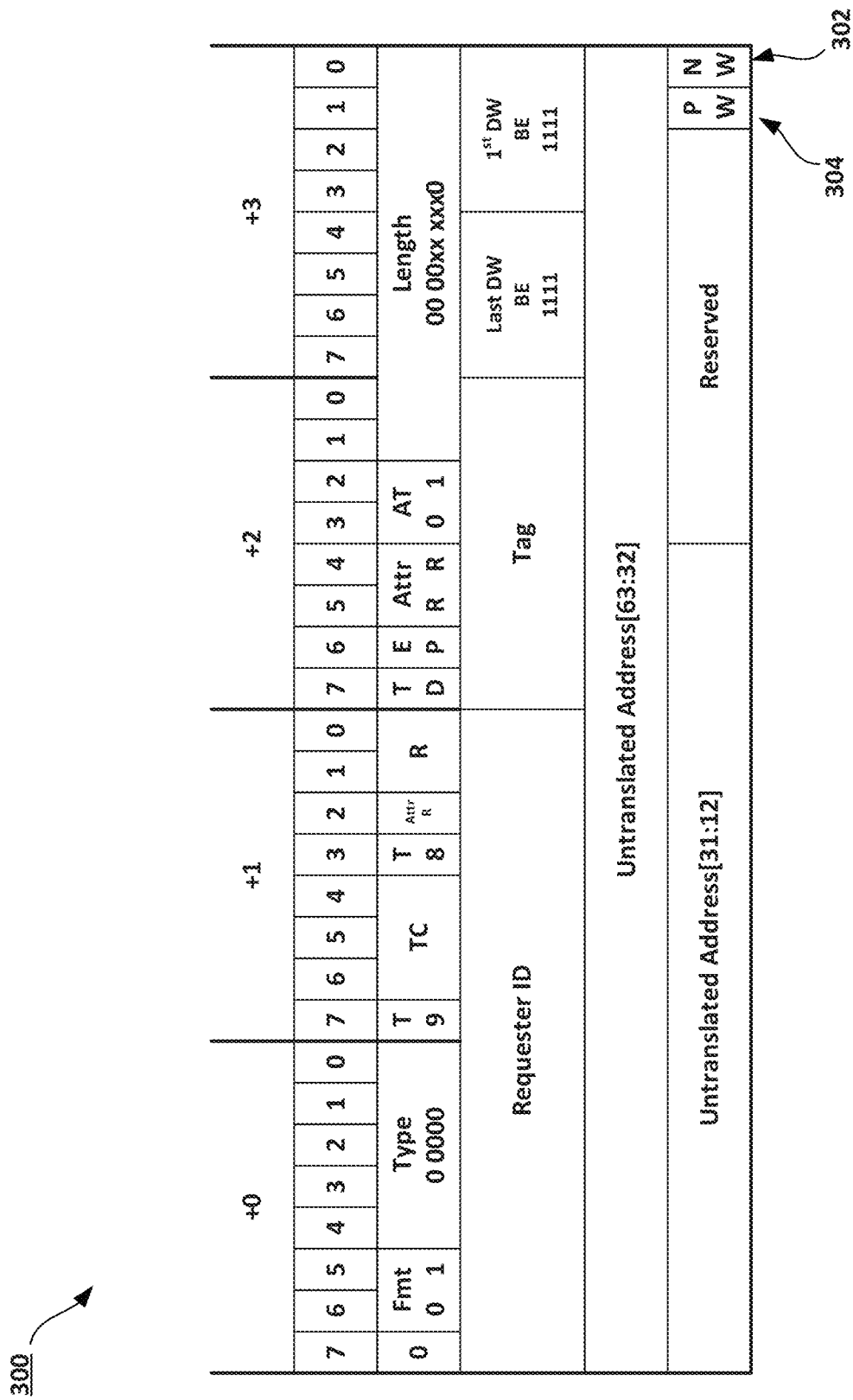
FIG. 3 is a schematic diagram of an example address translation request message the includes a potential write indicator bit in accordance with embodiments of the present disclosure.

FIG. 3 is a schematic diagram of an example Address Translation Request message the includes a potential write indicator bit in accordance with embodiments of the present disclosure. More specifically, FIG. 3 illustrates a 64 bit Translation Request Header 300 (referred to herein as TRH 30). TRH 300 can include a no write (NW) bit 302. An ATC can use the NW bit (or flag) 302 to request desired permissions. The NW flag 302, when Set (1) indicates that the devices is requesting read-only access for this translation, and the TA would treat the TRH 300 as a read-request and will not give out write-permission even if available in Address Translation and Protection Tables (ATPT). When NW flag 302 is Clear (0), the TA interprets the TRH 300 to mean that the device is requesting both read and write permission.

In embodiments of the disclosure, the TRH 300 can also include a potential write (PW) bit 304. When PW flag 304 is Set (1), the device is informing the TA that it may later need to write to the page and hence TA should provide the write-permission if available and safe to do so. When PW flag 304 is Clear (0), the TA behavior does not change from current PCIe ATS specification.

Figure 4:
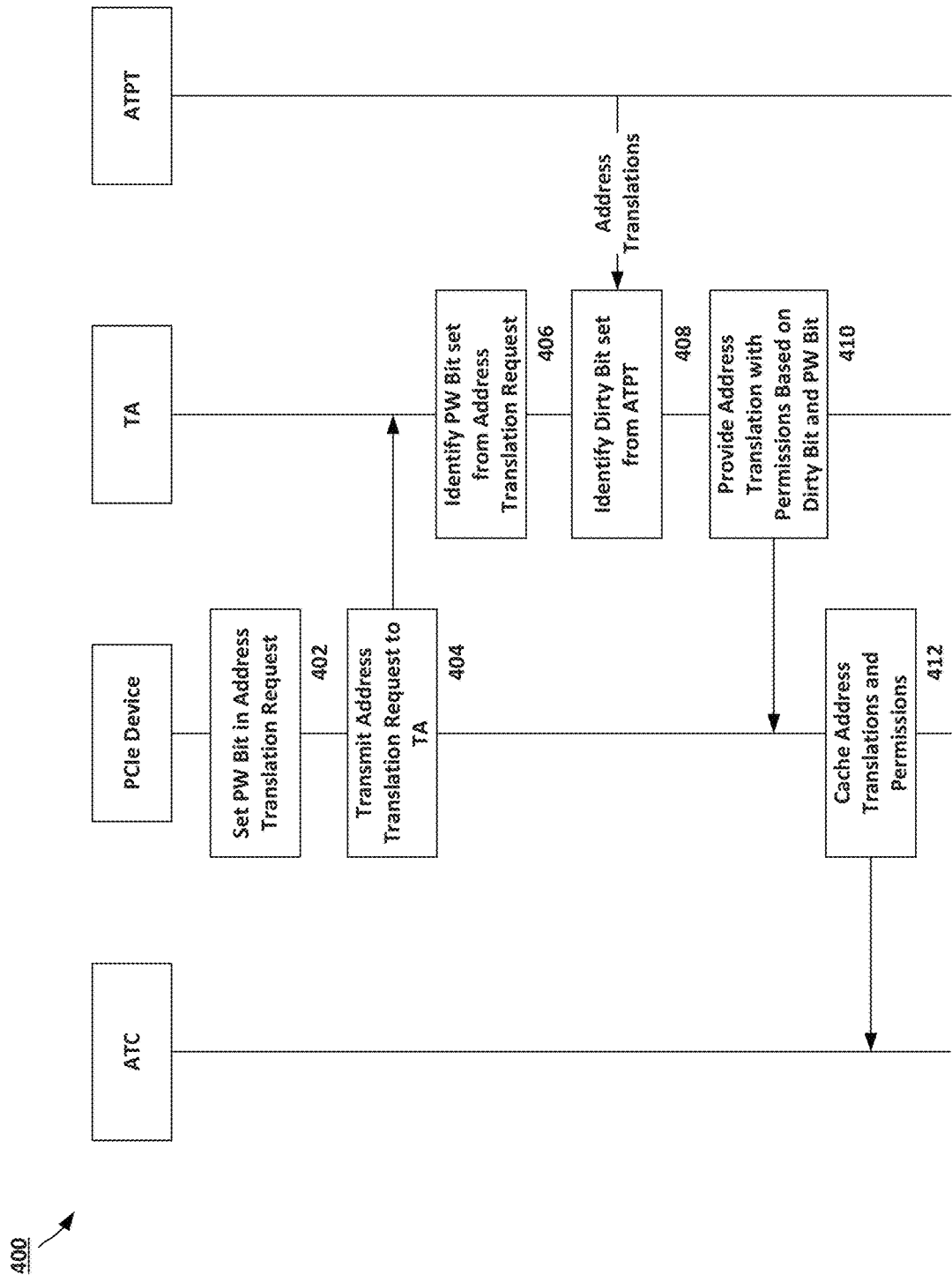
FIG. 4 is a swim-lane diagram illustrating example message flows between a translation agent and a connected device in accordance with embodiments of the present disclosure.

The PW flag 304 allows the TA to provide write permission in situations where the device anticipates a write access to a page or pages in the requested address space. The PW flag 304 can reduce the number of transactions (e.g., translation requests) needed for gaining the write permissions from the TA. The following flow charts describe how a TA can process Address Translation Requests based on the NW flag 302 and PW flag 304:

FIG. 4 is a swim-lane diagram 400 illustrating example message flows between a translation agent and a connected device in accordance with embodiments of the present disclosure. At the outset, a device, such as a downstream device coupled to a root complex through a PCIe-based interconnect protocol, can anticipate a possible write access to one or more memory address locations. Based on anticipating a possible write access to one or more memory address locations, the device can set a Potential Write flag in a Translation Request (402). The device can send the translation request to the TA across a PCIe-based link (404).

The TA can receive the Translation Request and determine whether the NW bit is set and whether the PW bit is set (406). After receiving an Address Translation Request message, such as that which includes a TRH and a PW flag, a TA can treat the Address Translation request message as follows:

When PW flag is Set, the TA can behave in the following way:

1) TA ignores the value of NW flag;
2) TA can set the Access bit in the ATPT (in a manner similar to setting Access bit based on NW flag);

TA can observe the dirty bit (or modified bit) from the ATPT (408) and respond according to the following:

a) If ATPT has a dirty bit for the translation Set, the TA would put the value of an effective Read permission (from ATPT) in TranslationCompletion.R and effective Write permissions (from ATPT) in TranslationCompletion.W. Thus TA behaved as if PW flag did not exist and request came with NW flag Clear.

b) If ATPT has a dirty bit for the translation Clear, the TA would put the value of an effective Read permission in TranslationCompletion.R and can set a value of 0 in TranslationCompletion.W. Thus the TA is to behave as if PW flag did not exist and request came with NW flag Set.

If PW flag is clear, then the TA can use the NW flag to set permissions.

Some embodiments may combine the two flags of single bits into a single flag field of two bits and define the encodings as described in Table 1 to allow future extensibility.

TABLE 1

PWNW Flag Indicators

| PWNW Flag [1:0] | Description | TA behavior |
|---|---|---|
| 00b | ReadWrite | Same as existing behavior for NW = 0 |
| 01b | Read | Same as existing behavior for NW = 1 |
| 10b | ReadPotentialWrite | If Dirty bit for translation Set, same behavior as for Flag = 00b<br>If Dirty bit for translation Clear, same behavior as for Flag = 01b |
| 11b | Reserved | Same behavior as Flag = 01 until new usage model is defined<br>Or: Same behavior as Flag = 00 till new usage model is defined |

The TA can then provide the device with the translations and permissions, based on the PW bit and dirty bits (410). The device can then cache the translations and the permissions in an ATC or other translation storage medium (412).

Figure 5:
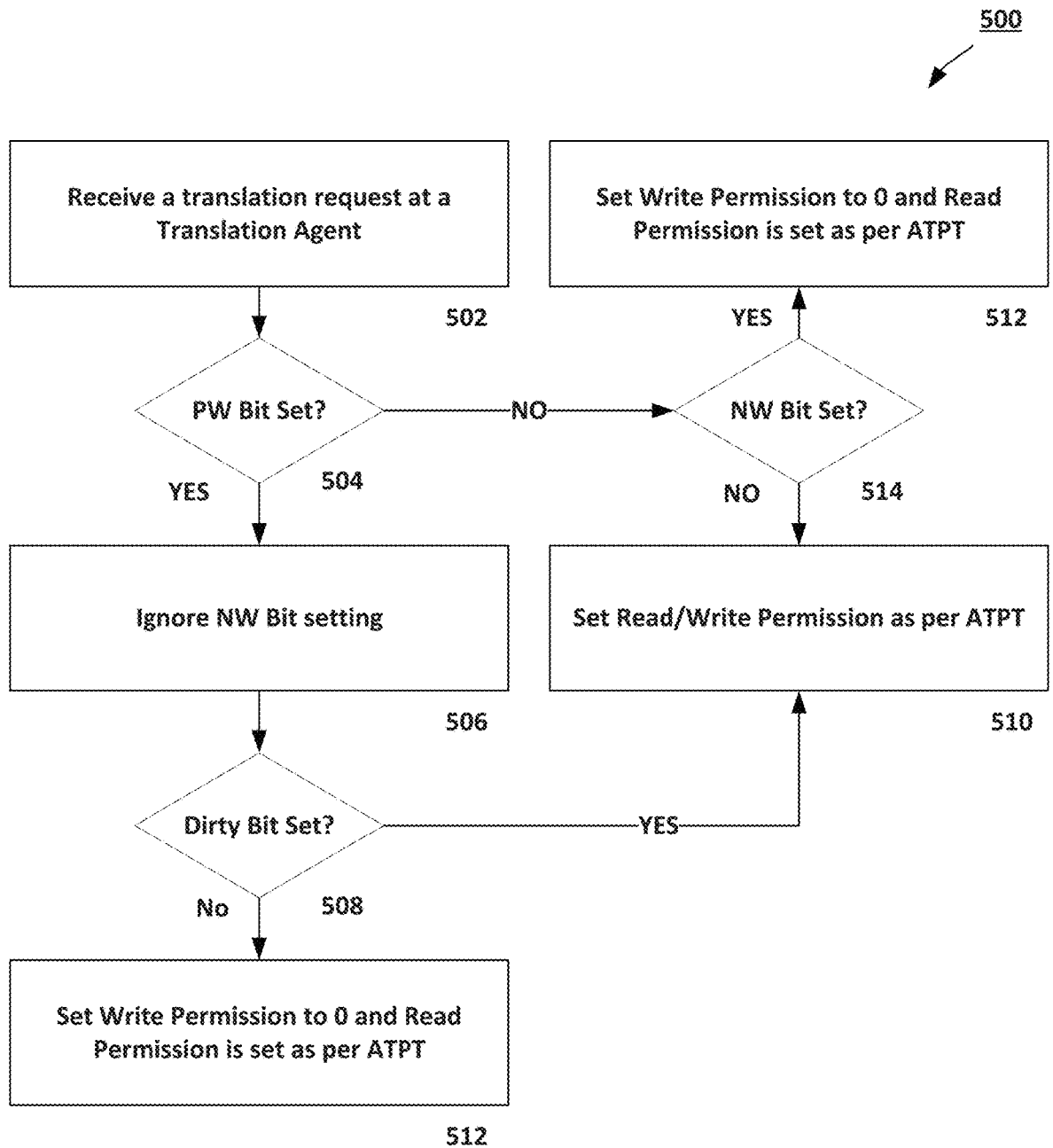
FIG. 5 is a process flow diagram for determining write permissions based on a potential write flag in a received address translation request message in accordance with embodiments of the present disclosure.

FIG. 5 is a process flow diagram 500 for a translation agent to determine write permissions based on a potential write flag in a received address translation request message in accordance with embodiments of the present disclosure. A translation agent (TA) can receive an translation request from a downstream device across an interconnect, such as that based on a PCIe protocol (502). The TA can determine from the translation request whether a potential write (PW) bit (or flag) has been set in the translation request (504). In embodiments, if the PW bit is set, then the TA can ignore a NW bit in the translation request (506).

If the PW bit has been set, then the TA can determine whether a dirty bit (or modified bit) has been set by the Address Translations and Protection Table (ATPT) for the addresses specified in the translation request (508). If the dirty bit is set, then the TA can set read+write permissions for the addresses specified in the translation request (510). If the dirty bit is not set (dirty bit is clear), then the TA can set the permissions to read only (512).

If the TA determines that the PW bit is clear (or that not PW bit is used in the translation request), then the TA can observe the NW bit (514). If the NW bit is clear, then the TA can set permissions for the addresses specified in the translation request to read+write (510). If the NW bit is set, then the TA sets permissions to read only (512).

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Figure 6:
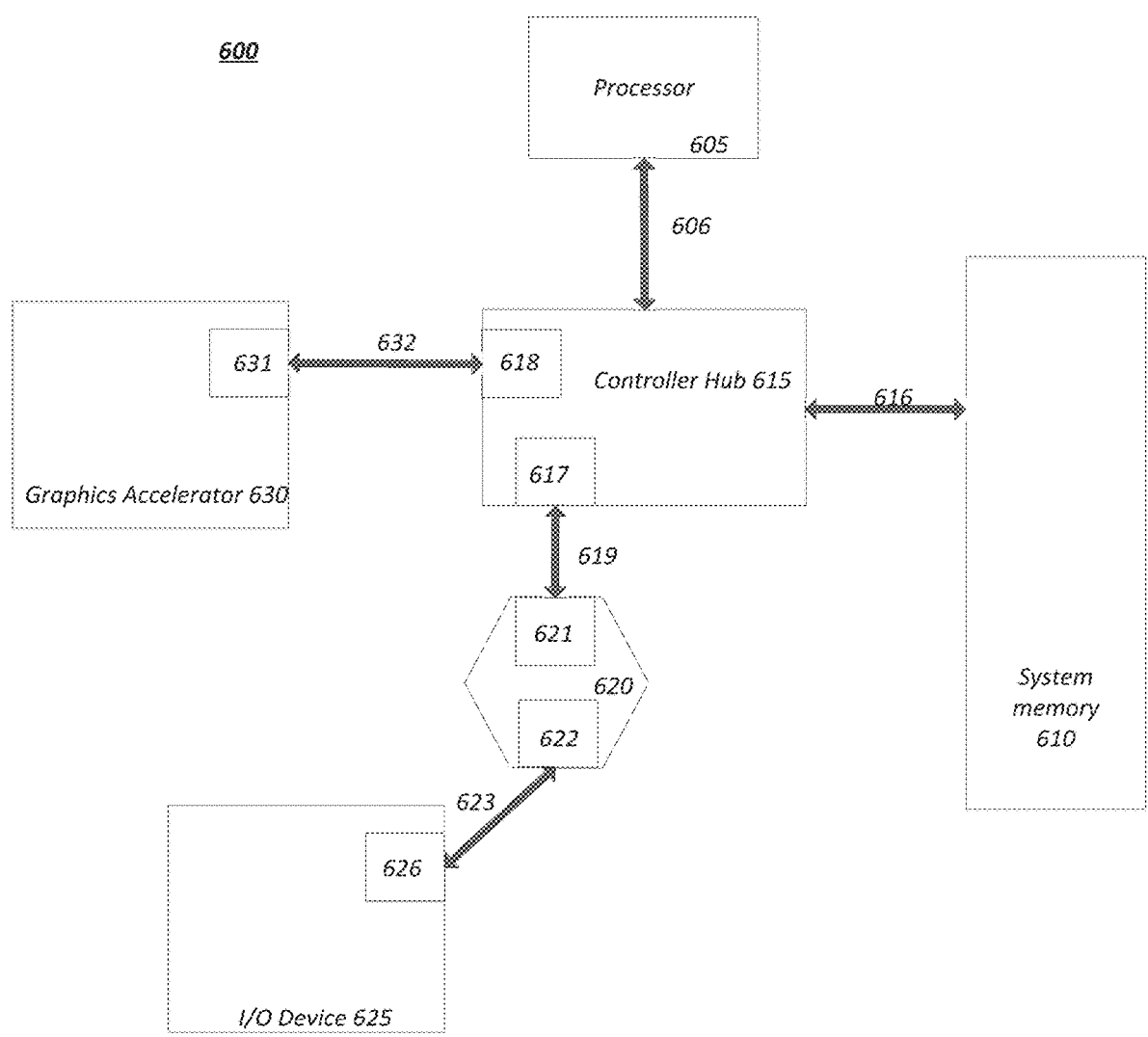
FIG. 6 illustrates an embodiment of a computing system including an interconnect architecture.

Referring to FIG. 6, an embodiment of a fabric composed of point-to-point Links that interconnect a set of components is illustrated. System 600 includes processor 605 and system memory 610 coupled to controller hub 615. Processor 605 includes any processing element, such as a microprocessor, a host processor, an embedded processor, a co-processor, or other processor. Processor 605 is coupled to controller hub 615 through front-side bus (FSB) 606. In one embodiment, FSB 606 is a serial point-to-point interconnect as described below. In another embodiment, link 606 includes a serial, differential interconnect architecture that is compliant with different interconnect standard.

System memory 610 includes any memory device, such as random access memory (RAM), non-volatile (NV) memory, or other memory accessible by devices in system 600. System memory 610 is coupled to controller hub 615 through memory interface 616. Examples of a memory interface include a double-data rate (DDR) memory interface, a dual-channel DDR memory interface, and a dynamic RAM (DRAM) memory interface.

In one embodiment, controller hub 615 is a root hub, root complex, or root controller in a Peripheral Component Interconnect Express (PCIe or PCIE) interconnection hierarchy. Examples of controller hub 615 include a chipset, a memory controller hub (MCH), a northbridge, an interconnect controller hub (ICH) a southbridge, and a root port controller/hub. Often the term chipset refers to two physically separate controller hubs, i.e. a memory controller hub (MCH) coupled to an interconnect controller hub (ICH). Note that current systems often include the MCH integrated with processor 605, while controller 615 is to communicate with I/O devices, in a similar manner as described below. In some embodiments, peer-to-peer routing is optionally supported through root complex 615.

Here, controller hub 615 is coupled to switch/bridge 620 through serial link 619. Input/output modules 617 and 621, which may also be referred to as interfaces/ports 617 and 621, include/implement a layered protocol stack to provide communication between controller hub 615 and switch 620. In one embodiment, multiple devices are capable of being coupled to switch 620.

Switch/bridge 620 routes packets/messages from device 625 upstream, i.e. up a hierarchy towards a root complex, to controller hub 615 and downstream, i.e. down a hierarchy away from a root port controller, from processor 605 or system memory 610 to device 625. Switch 620, in one embodiment, is referred to as a logical assembly of multiple virtual PCI-to-PCI bridge devices. Device 625 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 625 may include a PCIe to PCI/PCI-X bridge to support legacy or other version PCI devices. Endpoint devices in PCIe are often classified as legacy, PCIe, or root complex integrated endpoints.

Graphics accelerator 630 is also coupled to controller hub 615 through serial link 632. In one embodiment, graphics accelerator 630 is coupled to an MCH, which is coupled to an ICH. Switch 620, and accordingly I/O device 625, is then coupled to the ICH. I/O modules 631 and 618 are also to implement a layered protocol stack to communicate between graphics accelerator 630 and controller hub 615. Similar to the MCH discussion above, a graphics controller or the graphics accelerator 630 itself may be integrated in processor 605.

Figure 7:
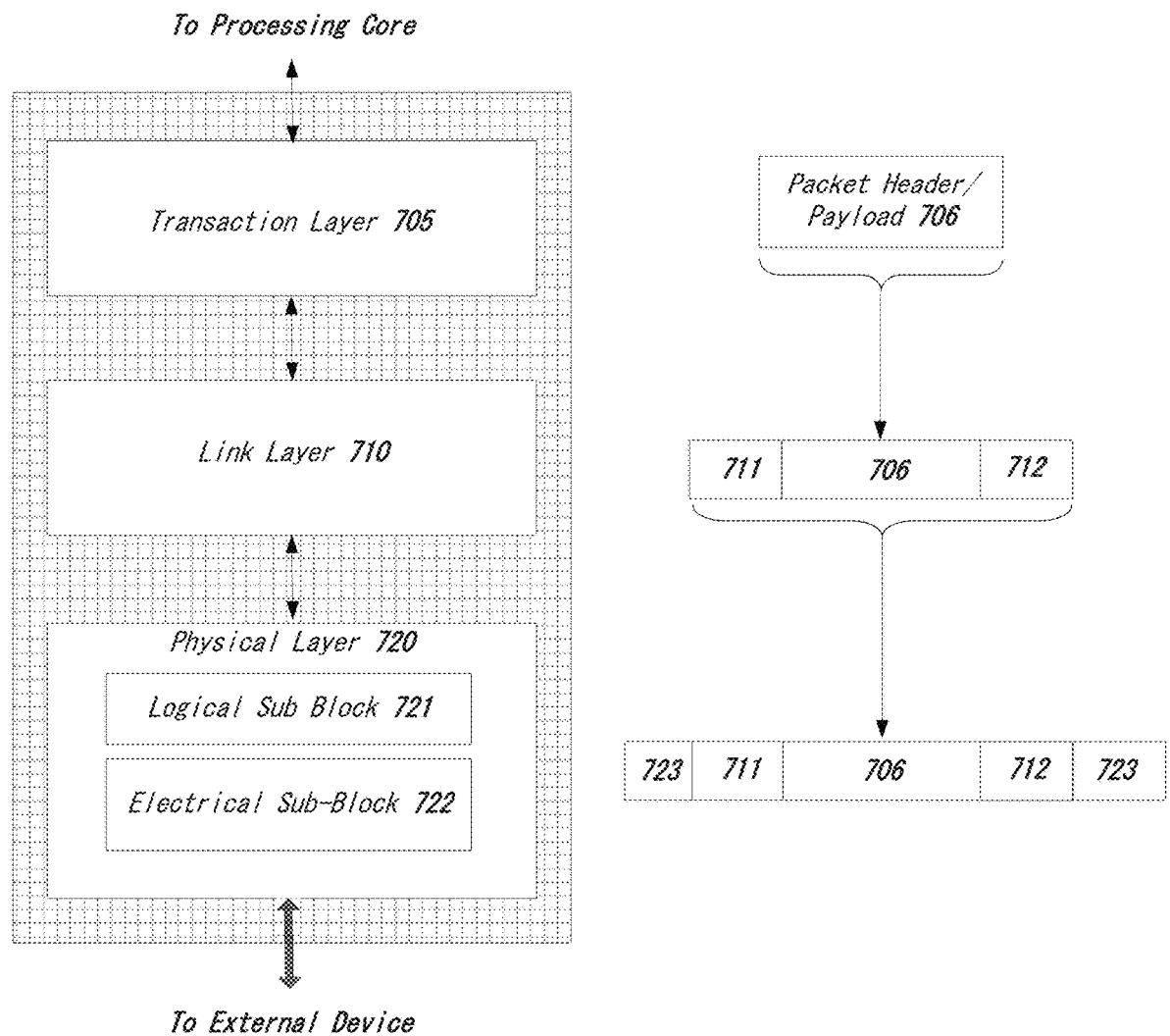
FIG. 7 illustrates an embodiment of an interconnect architecture including a layered stack.

Turning to FIG. 7 an embodiment of a layered protocol stack is illustrated. Layered protocol stack 700 includes any form of a layered communication stack, such as a Quick Path Interconnect (QPI) stack, a PCIe stack, a next generation high performance computing interconnect stack, or other layered stack. Although the discussion immediately below in reference to FIGS. 6-9 are in relation to a PCIe stack, the same concepts may be applied to other interconnect stacks. In one embodiment, protocol stack 700 is a PCIe protocol stack including transaction layer 705, link layer 710, and physical layer 720. An interface, such as interfaces 617, 618, 621, 622, 626, and 631 in FIG. 1, may be represented as communication protocol stack 700. Representation as a communication protocol stack may also be referred to as a module or interface implementing/including a protocol stack.

PCI Express uses packets to communicate information between components. Packets are formed in the Transaction Layer 705 and Data Link Layer 710 to carry the information from the transmitting component to the receiving component. As the transmitted packets flow through the other layers, they are extended with additional information necessary to handle packets at those layers. At the receiving side the reverse process occurs and packets get transformed from their Physical Layer 720 representation to the Data Link Layer 710 representation and finally (for Transaction Layer Packets) to the form that can be processed by the Transaction Layer 705 of the receiving device.

Transaction Layer

In one embodiment, transaction layer 705 is to provide an interface between a device's processing core and the interconnect architecture, such as data link layer 710 and physical layer 720. In this regard, a primary responsibility of the transaction layer 705 is the assembly and disassembly of packets (i.e., transaction layer packets, or TLPs). The translation layer 705 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 705. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 705 assembles packet header/payload 706. Format for current packet headers/payloads may be found in the PCIe specification at the PCIe specification website.

Figure 8:
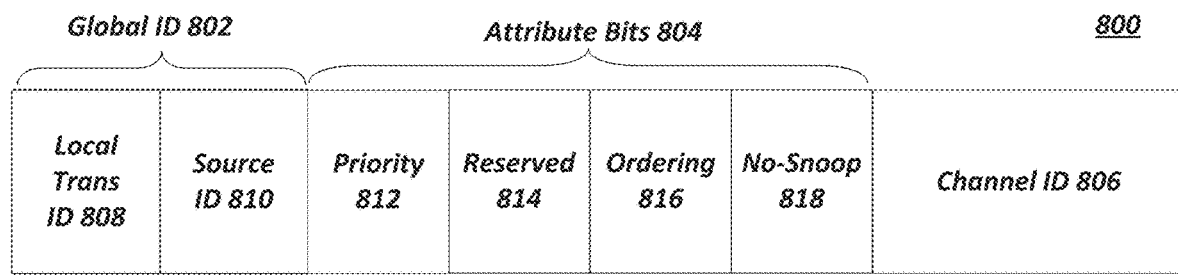
FIG. 8 illustrates an embodiment of a request or packet to be generated or received within an interconnect architecture.

Quickly referring to FIG. 8, an embodiment of a PCIe transaction descriptor is illustrated. In one embodiment, transaction descriptor 800 is a mechanism for carrying transaction information. In this regard, transaction descriptor 800 supports identification of transactions in a system. Other potential uses include tracking modifications of default transaction ordering and association of transaction with channels.

Transaction descriptor 800 includes global identifier field 802, attributes field 804, and channel identifier field 806. In the illustrated example, global identifier field 802 is depicted comprising local transaction identifier field 808 and source identifier field 810. In one embodiment, global transaction identifier 802 is unique for all outstanding requests.

According to one implementation, local transaction identifier field 808 is a field generated by a requesting agent, and it is unique for all outstanding requests that require a completion for that requesting agent. Furthermore, in this example, source identifier 810 uniquely identifies the requestor agent within a PCIe hierarchy. Accordingly, together with source ID 810, local transaction identifier 808 field provides global identification of a transaction within a hierarchy domain.

Attributes field 804 specifies characteristics and relationships of the transaction. In this regard, attributes field 804 is potentially used to provide additional information that allows modification of the default handling of transactions. In one embodiment, attributes field 804 includes priority field 812, reserved field 814, ordering field 816, and no-snoop field 818. Here, priority sub-field 812 may be modified by an initiator to assign a priority to the transaction. Reserved attribute field 814 is left reserved for future, or vendor-defined usage. Possible usage models using priority or security attributes may be implemented using the reserved attribute field.

In this example, ordering attribute field 816 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 818 is utilized to determine if transactions are snooped. As shown, channel ID Field 806 identifies a channel that a transaction is associated with.

Link Layer

Link layer 710, also referred to as data link layer 710, acts as an intermediate stage between transaction layer 705 and the physical layer 720. In one embodiment, a responsibility of the data link layer 710 is providing a reliable mechanism for exchanging Transaction Layer Packets (TLPs) between two components a link. One side of the Data Link Layer 710 accepts TLPs assembled by the Transaction Layer 705, applies packet sequence identifier 711, i.e. an identification number or packet number, calculates and applies an error detection code, i.e. CRC 712, and submits the modified TLPs to the Physical Layer 720 for transmission across a physical to an external device.

Physical Layer

In one embodiment, physical layer 720 includes logical sub block 721 and electrical sub-block 722 to physically transmit a packet to an external device. Here, logical sub-block 721 is responsible for the "digital" functions of Physical Layer 721. In this regard, the logical sub-block includes a transmit section to prepare outgoing information for transmission by physical sub-block 722, and a receiver section to identify and prepare received information before passing it to the Link Layer 710.

Physical block 722 includes a transmitter and a receiver. The transmitter is supplied by logical sub-block 721 with symbols, which the transmitter serializes and transmits onto to an external device. The receiver is supplied with serialized symbols from an external device and transforms the received signals into a bit-stream. The bit-stream is de-serialized and supplied to logical sub-block 721. In one embodiment, an 8b/10b transmission code is employed, where ten-bit symbols are transmitted/received. Here, special symbols are used to frame a packet with frames 723. In addition, in one example, the receiver also provides a symbol clock recovered from the incoming serial stream.

As stated above, although transaction layer 705, link layer 710, and physical layer 720 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 9:
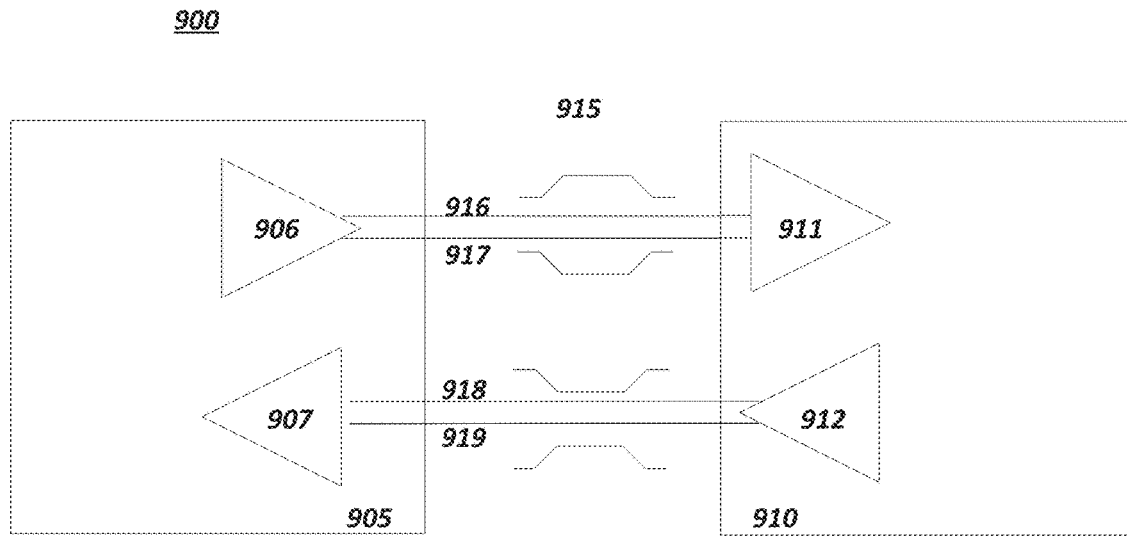
FIG. 9 illustrates an embodiment of a transmitter and receiver pair for an interconnect architecture.

Referring next to FIG. 9, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 906/911 and a receive pair 912/907. Accordingly, device 905 includes transmission logic 906 to transmit data to device 910 and receiving logic 907 to receive data from device 910. In other words, two transmitting paths, i.e. paths 916 and 917, and two receiving paths, i.e. paths 918 and 919, are included in a PCIe link.

A transmission path refers to any path for transmitting data, such as a transmission line, a copper line, an optical line, a wireless communication channel, an infrared communication link, or other communication path. A connection between two devices, such as device 905 and device 910, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Note that the apparatus, methods, and systems described above may be implemented in any electronic device or system as aforementioned. As specific illustrations, the figures below provide exemplary systems for utilizing the disclosure as described herein. As the systems below are described in more detail, a number of different interconnects are disclosed, described, and revisited from the discussion above. And as is readily apparent, the advances described above may be applied to any of those interconnects, fabrics, or architectures.

Figure 10:
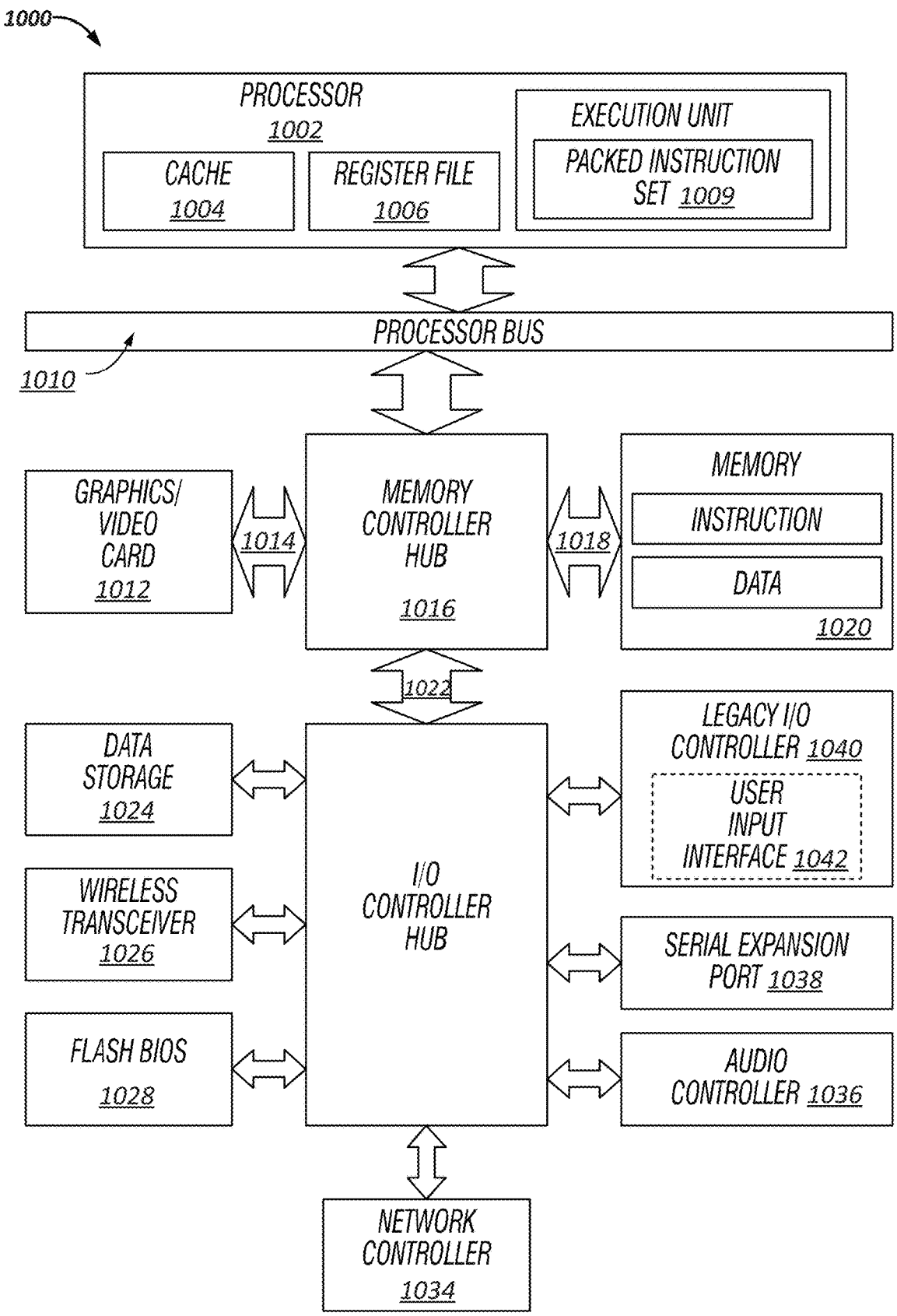
FIG. 10 illustrates another embodiment of a block diagram for a computing system including a processor.

Turning to FIG. 10, a block diagram of an exemplary computer system formed with a processor that includes execution units to execute an instruction, where one or more of the interconnects implement one or more features in accordance with one embodiment of the present disclosure is illustrated. System 1000 includes a component, such as a processor 1002 to employ execution units including logic to perform algorithms for process data, in accordance with the present disclosure, such as in the embodiment described herein. System 1000 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 1000 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1002 includes one or more execution units 1008 to implement an algorithm that is to perform at least one instruction. One embodiment may be described in the context of a single processor desktop or server system, but alternative embodiments may be included in a multiprocessor system. System 1000 is an example of a 'hub' system architecture. The computer system 1000 includes a processor 1002 to process data signals. The processor 1002, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1002 is coupled to a processor bus 1010 that transmits data signals between the processor 1002 and other components in the system 1000. The elements of system 1000 (e.g. graphics accelerator 1012, memory controller hub 1016, memory 1020, I/O controller hub 1024, wireless transceiver 1026, Flash BIOS 1028, Network controller 1034, Audio controller 1036, Serial expansion port 1038, I/O controller 1040, etc.) perform their conventional functions that are well known to those familiar with the art.

In one embodiment, the processor 1002 includes a Level 1 (L1) internal cache memory 1004. Depending on the architecture, the processor 1002 may have a single internal cache or multiple levels of internal caches. Other embodiments include a combination of both internal and external caches depending on the particular implementation and needs. Register file 1006 is to store different types of data in various registers including integer registers, floating point registers, vector registers, banked registers, shadow registers, checkpoint registers, status registers, and instruction pointer register.

Execution unit 1008, including logic to perform integer and floating point operations, also resides in the processor 1002. The processor 1002, in one embodiment, includes a microcode (ucode) ROM to store microcode, which when executed, is to perform algorithms for certain macroinstructions or handle complex scenarios. Here, microcode is potentially updateable to handle logic bugs/fixes for processor 1002. For one embodiment, execution unit 1008 includes logic to handle a packed instruction set 1009. By including the packed instruction set 1009 in the instruction set of a general-purpose processor 1002, along with associated circuitry to execute the instructions, the operations used by many multimedia applications may be performed using packed data in a general-purpose processor 1002. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1008 may also be used in micro controllers, embedded processors, graphics devices, DSPs, and other types of logic circuits. System 1000 includes a memory 1020. Memory 1020 includes a dynamic random access memory (DRAM) device, a static random access memory (SRAM) device, flash memory device, or other memory device. Memory 1020 stores instructions and/or data represented by data signals that are to be executed by the processor 1002.

Note that any of the aforementioned features or aspects of the disclosure may be utilized on one or more interconnect illustrated in FIG. 10. For example, an on-die interconnect (ODI), which is not shown, for coupling internal units of processor 1002 implements one or more aspects of the disclosure described above. Or the disclosure is associated with a processor bus 1010 (e.g. Intel Quick Path Interconnect (QPI) or other known high performance computing interconnect), a high bandwidth memory path 1018 to memory 1020, a point-to-point link to graphics accelerator 1012 (e.g. a Peripheral Component Interconnect express (PCIe) compliant fabric), a controller hub interconnect 1022, an I/O or other interconnect (e.g. USB, PCI, PCIe) for coupling the other illustrated components. Some examples of such components include the audio controller 1036, firmware hub (flash BIOS) 1028, wireless transceiver 1026, data storage 1024, legacy I/O controller 1010 containing user input and keyboard interfaces 1042, a serial expansion port 1038 such as Universal Serial Bus (USB), and a network controller 1034. The data storage device 1024 can comprise a hard disk drive, a floppy disk drive, a CD-ROM device, a flash memory device, or other mass storage device.

Figure 11:
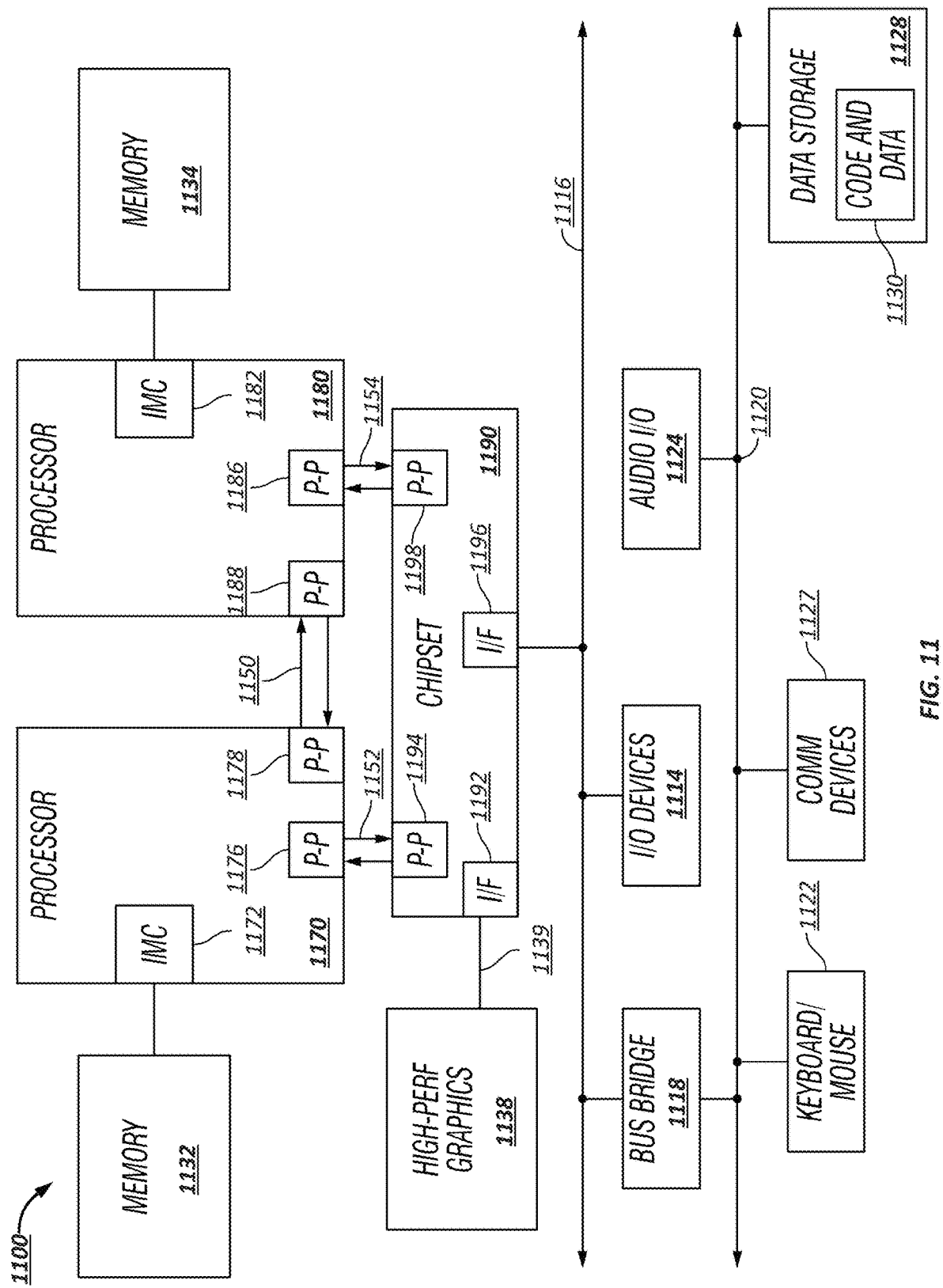
FIG. 11 illustrates an embodiment of a block for a computing system including multiple processor sockets.

Referring now to FIG. 11, shown is a block diagram of a second system 1100 in accordance with an embodiment of the present disclosure. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of a processor. In one embodiment, 1152 and 1154 are part of a serial, point-to-point coherent interconnect fabric, such as Intel's Quick Path Interconnect (QPI) architecture. As a result, the disclosure may be implemented within the QPI architecture.

While shown with only two processors 1170, 1180, it is to be understood that the scope of the present disclosure is not so limited. In other embodiments, one or more additional processors may be present in a given processor.

Processors 1170 and 1180 are shown including integrated memory controller units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 each exchange information with a chipset 1190 via individual P-P interfaces 1152, 1154 using point to point interface circuits 1176, 1194, 1186, 1198. Chipset 1190 also exchanges information with a high-performance graphics circuit 1138 via an interface circuit 1192 along a high-performance graphics interconnect 1139.

A shared cache (not shown) may be included in either processor or outside of both processors; yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present disclosure is not so limited.

As shown in FIG. 11, various I/O devices 1114 are coupled to first bus 1116, along with a bus bridge 1118 which couples first bus 1116 to a second bus 1120. In one embodiment, second bus 1120 includes a low pin count (LPC) bus. Various devices are coupled to second bus 1120 including, for example, a keyboard and/or mouse 1122, communication devices 1127 and a storage unit 1128 such as a disk drive or other mass storage device which often includes instructions/code and data 1130, in one embodiment. Further, an audio I/O 1124 is shown coupled to second bus 1120. Note that other architectures are possible, where the included components and interconnect architectures vary. For example, instead of the point-to-point architecture of FIG. 11, a system may implement a multi-drop bus or other such architecture.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

Figure 12:
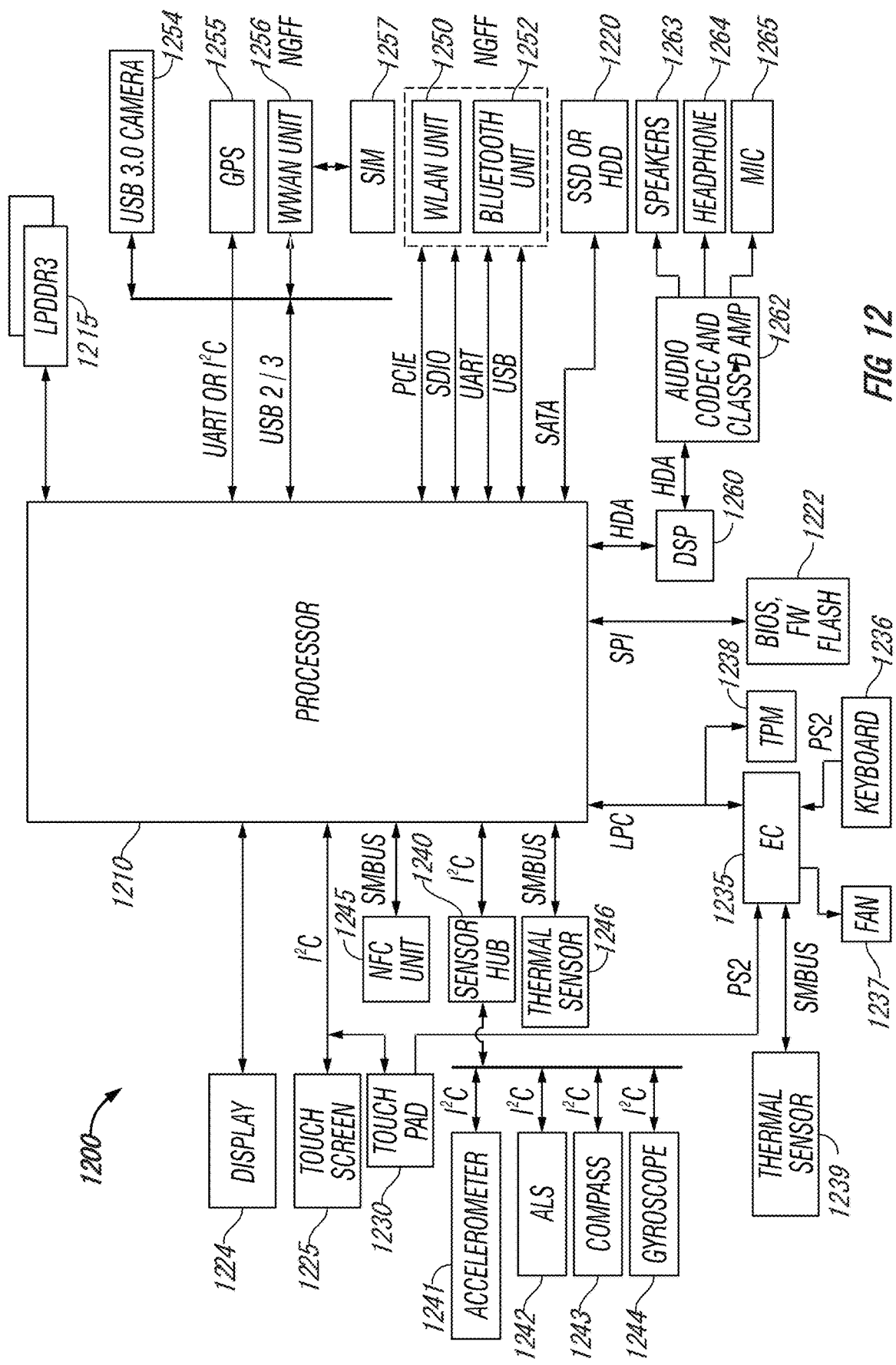
FIG. 12 illustrates another embodiment of a block diagram for a computing system.

Referring now to FIG. 12, a block diagram of components present in a computer system in accordance with an embodiment of the present disclosure is illustrated. As shown in FIG. 12, system 1200 includes any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 12 is intended to show a high level view of many components of the computer system. However, it is to be understood that some of the components shown may be omitted, additional components may be present, and different arrangement of the components shown may occur in other implementations. As a result, the disclosure described above may be implemented in any portion of one or more of the interconnects illustrated or described below.

As seen in FIG. 12, a processor 1210, in one embodiment, includes a microprocessor, multi-core processor, multi-threaded processor, an ultra low voltage processor, an embedded processor, or other known processing element. In the illustrated implementation, processor 1210 acts as a main processing unit and central hub for communication with many of the various components of the system 1200. As one example, processor 1200 is implemented as a system on a chip (SoC). As a specific illustrative example, processor 1210 includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instructions set that performs defined algorithms as set forth by the processor licensor. Here, the microarchitectural implementation may vary, but the architectural function of the processor is usually consistent. Certain details regarding the architecture and operation of processor 1210 in one implementation will be discussed further below to provide an illustrative example.

Processor 1210, in one embodiment, communicates with a system memory 1215. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (67P). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 1220 may also couple to processor 1210. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 12, a flash device 1222 may be coupled to processor 1210, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120 GB-1 TB.

Various input/output (IO) devices may be present within system 1200. Specifically shown in the embodiment of FIG. 12 is a display 1224 which may be a high definition LCD or LED panel configured within a lid portion of the chassis. This display panel may also provide for a touch screen 1225, e.g., adapted externally over the display panel such that via a user's interaction with this touch screen, user inputs can be provided to the system to enable desired operations, e.g., with regard to the display of information, accessing of information and so forth. In one embodiment, display 1224 may be coupled to processor 1210 via a display interconnect that can be implemented as a high performance graphics interconnect. Touch screen 1225 may be coupled to processor 1210 via another interconnect, which in an embodiment can be an I2C interconnect. As further shown in FIG. 12, in addition to touch screen 1225, user input by way of touch can also occur via a touch pad 1230 which may be configured within the chassis and may also be coupled to the same I2C interconnect as touch screen 1225.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920×1080p), be compatible with an embedded display port (eDP), and be a low power panel with panel self refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited 10 interference when using multi-touch.

For perceptual computing and other purposes, various sensors may be present within the system and may be coupled to processor 1210 in different manners. Certain inertial and environmental sensors may couple to processor 1210 through a sensor hub 1240, e.g., via an I2C interconnect. In the embodiment shown in FIG. 12, these sensors may include an accelerometer 1241, an ambient light sensor (ALS) 1242, a compass 1243 and a gyroscope 1244. Other environmental sensors may include one or more thermal sensors 1246 which in some embodiments couple to processor 1210 via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

Also seen in FIG. 12, various peripheral devices may couple to processor 1210 via a low pin count (LPC) interconnect. In the embodiment shown, various components can be coupled through an embedded controller 1235. Such components can include a keyboard 1236 (e.g., coupled via a PS2 interface), a fan 1237, and a thermal sensor 1239. In some embodiments, touch pad 1230 may also couple to EC 1235 via a PS2 interface. In addition, a security processor such as a trusted platform module (TPM) 1238 in accordance with the Trusted Computing Group (TCG) TPM Specification Version 1.2, dated Oct. 2, 2003, may also couple to processor 1210 via this LPC interconnect. However, understand the scope of the present disclosure is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 1200 can communicate with external devices in a variety of manners, including wirelessly. In the embodiment shown in FIG. 12, various wireless modules, each of which can correspond to a radio configured for a particular wireless communication protocol, are present. One manner for wireless communication in a short range such as a near field may be via a near field communication (NFC) unit 1245 which may communicate, in one embodiment with processor 1210 via an SMBus. Note that via this NFC unit 1245, devices in close proximity to each other can communicate. For example, a user can enable system 1200 to communicate with another (e.g.) portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 12, additional wireless units can include other short range wireless engines including a WLAN unit 1250 and a Bluetooth unit 1252. Using WLAN unit 1250, Wi-Fi™ communications in accordance with a given Institute of Electrical and Electronics Engineers (IEEE) 802.11 standard can be realized, while via Bluetooth unit 1252, short range communications via a Bluetooth protocol can occur. These units may communicate with processor 1210 via, e.g., a USB link or a universal asynchronous receiver transmitter (UART) link. Or these units may couple to processor 1210 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 1256 which in turn may couple to a subscriber identity module (SIM) 1257. In addition, to enable receipt and use of location information, a GPS module 1255 may also be present. Note that in the embodiment shown in FIG. 12, WWAN unit 1256 and an integrated capture device such as a camera module 1254 may communicate via a given USB protocol such as a USB 2.0 or 3.0 link, or a UART or I2C protocol. Again the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multifunction device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 1260, which may couple to processor 1210 via a high definition audio (HDA) link. Similarly, DSP 1260 may communicate with an integrated coder/decoder (CODEC) and amplifier 1262 that in turn may couple to output speakers 1263 which may be implemented within the chassis. Similarly, amplifier and CODEC 1262 can be coupled to receive audio inputs from a microphone 1265 which in an embodiment can be implemented via dual array microphones (such as a digital microphone array) to provide for high quality audio inputs to enable voice-activated control of various operations within the system. Note also that audio outputs can be provided from amplifier/CODEC 1262 to a headphone jack 1264. Although shown with these particular components in the embodiment of FIG. 12, understand the scope of the present disclosure is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 1210 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC 1235. This sustain power plane also powers an on-die voltage regulator that supports the onboard SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC 1235 may be sent to the PCH instead of the processor during the connected standby state so that the PCH can manage the wakeup processing instead of the processor. In addition, the TSC is maintained in the PCH to facilitate sustaining processor architectural functions. Although shown with these particular components in the embodiment of FIG. 12, understand the scope of the present disclosure is not limited in this regard.

Power control in the processor can lead to enhanced power savings. For example, power can be dynamically allocate between cores, individual cores can change frequency/voltage, and multiple deep low power states can be provided to enable very low power consumption. In addition, dynamic control of the cores or independent core portions can provide for reduced power consumption by powering off components when they are not being used.

Some implementations may provide a specific power management IC (PMIC) to control platform power. Using this solution, a system may see very low (e.g., less than 5%) battery degradation over an extended duration (e.g., 16 hours) when in a given standby state, such as when in a Win8 Connected Standby state. In a Win8 idle state a battery life exceeding, e.g., 9 hours may be realized (e.g., at 150 nits). As to video playback, a long battery life can be realized, e.g., full HD video playback can occur for a minimum of 6 hours. A platform in one implementation may have an energy capacity of, e.g., 35 watt hours (Whr) for a Win8 CS using an SSD and (e.g.) 40-44 Whr for Win8 CS using an HDD with a RST cache configuration.

A particular implementation may provide support for 15 W nominal CPU thermal design power (TDP), with a configurable CPU TDP of up to approximately 25 W TDP design point. The platform may include minimal vents owing to the thermal features described above. In addition, the platform is pillow-friendly (in that no hot air is blowing at the user). Different maximum temperature points can be realized depending on the chassis material. In one implementation of a plastic chassis (at least having to lid or base portion of plastic), the maximum operating temperature can be 52 degrees Celsius (C). And for an implementation of a metal chassis, the maximum operating temperature can be 46° C.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

While this disclosure has been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase "to" or "configured to," in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

In the claims, and elsewhere in this document, an order of operations is not implied. The systems, methods, and apparatuses can include one or a combination of the following examples:

Example 1 an apparatus comprising circuitry to receive a memory address translation request message from a downstream connected device; identify, from the memory address translation request message, a permission indication that the device intends to perform a write access to one or more memory address locations specified in the memory address translation request message; identify, from an address translation and protection table (ATPT), a dirty bit value associated with the one or more memory address locations; and transmit a translation of the one or more memory address locations and a read or read+write permission to the device based on the permission indication in the memory address translation request message and the dirty bit.

Example 2 may include the subject matter of example 1, wherein the memory address translation request message comprises a translation request header associated with a Peripheral Component Interconnect Express (PCIe)-based address translation services (ATS) protocol.

Example 3 may include the subject matter of any of examples 1-2, the apparatus comprising circuitry to determine that the permission indication comprises a potential write bit set; determine that the dirty bit is set; and transmit a read+write permission to the device for the one or more memory address locations specified by the memory address translation request message.

Example 4 may include the subject matter of any of examples 1-2, the apparatus comprising circuitry to determine that the permission indication comprises a potential write bit set; determine that the dirty bit is clear; and transmit a read-only permission to the device for the one or more memory address locations specified by the memory address translation request message.

Example 5 may include the subject matter of any of examples 1-2, the apparatus comprising circuitry to determine that the permission indication comprises a potential write bit set; determine that a no-write bit is set; and transmit a read-only permission to the device for the one or more memory address locations specified by the memory address translation request message.

Example 6 may include the subject matter of any of examples 1-2, the apparatus comprising circuitry to determine that the permission indication comprises a potential write bit set; determine that a no-write bit is set; and transmit a read+write permission to the device for the one or more memory address locations specified by the memory address translation request message.

Example 7 may include the subject matter of any of examples 1-6, wherein the apparatus comprises a translation agent.

Example 8 is a computer implemented method comprising receiving, at a translation agent, a memory address translation request message from a downstream connected device; identifying, from the memory address translation request message, a permission indication that the device intends to perform a write access to one or more memory address locations specified in the memory address translation request message; identifying, from an address translation and protection table (ATPT), a dirty bit value associated with the one or more memory address locations; and transmitting a translation of the one or more memory address locations and a read or read+write permission to the device based on the permission indication in the memory address translation request message and the dirty bit.

Example 9 may include the subject matter of example 8, wherein the memory address translation request message comprises a translation request header associated with a Peripheral Component Interconnect Express (PCIe)-based address translation services (ATS) protocol.

Example 10 may include the subject matter of any of examples 7-8, the method comprising determining that the permission indication comprises a potential write bit set; determining that the dirty bit is set; and transmitting a read+write permission to the device for the one or more memory address locations specified by the memory address translation request message.

Example 11 may include the subject matter of any of examples 7-8, the method comprising determining that the permission indication comprises a potential write bit set; determining that the dirty bit is clear; and transmitting a read-only permission to the device for the one or more memory address locations specified by the memory address translation request message.

Example 12 may include the subject matter of any of examples 7-8, the method comprising determining that the permission indication comprises a potential write bit set; determining that a no-write bit is set; and transmitting a read-only permission to the device for the one or more memory address locations specified by the memory address translation request message.

Example 13 may include the subject matter of any of examples 7-8, the method comprising determining that the permission indication comprises a potential write bit set; determining that a no-write bit is set; and transmitting a read+write permission to the device for the one or more memory address locations specified by the memory address translation request message.

Example 14 is a non-transitory computer-readable medium having program instructions stored therein, wherein the program instructions are executable by a computer system to perform operations comprising receiving, at a translation agent, a memory address translation request message from a downstream connected device; identifying, from the memory address translation request message, a permission indication that the device intends to perform a write access to one or more memory address locations specified in the memory address translation request message; identifying, from an address translation and protection table (ATPT), a dirty bit value associated with the one or more memory address locations; and transmitting a translation of the one or more memory address locations and a read or read+write permission to the device based on the permission indication in the memory address translation request message and the dirty bit.

Example 15 may include the subject matter of example 14, wherein the memory address translation request message comprises a translation request header associated with a Peripheral Component Interconnect Express (PCIe)-based address translation services (ATS) protocol.

Example 16 may include the subject matter of any of examples 14-15, the operations comprising determining that the permission indication comprises a potential write bit set; determining that the dirty bit is set; and transmitting a read+write permission to the device for the one or more memory address locations specified by the memory address translation request message.

Example 17 may include the subject matter of any of examples 14-15, the operations comprising determining that the permission indication comprises a potential write bit set; determining that the dirty bit is clear; and transmitting a read-only permission to the device for the one or more memory address locations specified by the memory address translation request message.

Example 18 may include the subject matter of any of examples 14-15, the operations comprising determining that the permission indication comprises a potential write bit set; determining that a no-write bit is set; and transmitting a read-only permission to the device for the one or more memory address locations specified by the memory address translation request message.

Example 19 may include the subject matter of any of examples 14-15, the operations comprising determining that the permission indication comprises a potential write bit set; determining that a no-write bit is set; and transmitting a read+write permission to the device for the one or more memory address locations specified by the memory address translation request message.

Example 20 is a system comprising a host system comprising a translation agent, and an address translation and protection table. The system includes an endpoint device coupled to the host system by a link based on a Peripheral Component Interconnect Express (PCIe) protocol, the endpoint device comprising an address translation cache and logic circuitry to construct a translation request header that comprises one or more memory addresses for translation and an indication of a potential write access to the one or more memory addresses, and transmit the translation request header to the translation agent across link. The translation agent can include circuitry to receive a memory address translation request message from a downstream connected device; identify, from the memory address translation request message, a permission indication that the device intends to perform a write access to one or more memory address locations specified in the memory address translation request message; identify, from an address translation and protection table (ATPT), a dirty bit value associated with the one or more memory address locations; and transmit a translation of the one or more memory address locations and a read or read+write permission to the device based on the permission indication in the memory address translation request message and the dirty bit.

Example 21 may include the subject matter of example 20, wherein the memory address translation request message comprises a translation request header associated with a Peripheral Component Interconnect Express (PCIe)-based address translation services (ATS) protocol.

Example 22 may include the subject matter of any of examples 20-21, the translation agent comprising circuitry to determine that the permission indication comprises a potential write bit set; determine that the dirty bit is set; and transmit a read+write permission to the device for the one or more memory address locations specified by the memory address translation request message.

Example 23 may include the subject matter of any of examples 20-21, the translation agent comprising circuitry to determine that the permission indication comprises a potential write bit set; determine that the dirty bit is clear; and transmit a read-only permission to the device for the one or more memory address locations specified by the memory address translation request message.

Example 24 may include the subject matter of any of examples 21-21, the translation agent comprising circuitry to determine that the permission indication comprises a potential write bit set; determine that a no-write bit is set; and transmit a read-only permission to the device for the one or more memory address locations specified by the memory address translation request message.

Example 25 may include the subject matter of any of examples 20, the translation agent comprising circuitry to determine that the permission indication comprises a potential write bit set; determine that a no-write bit is set; and transmit a read+write permission to the device for the one or more memory address locations specified by the memory address translation request message.

What is claimed is:

1. An apparatus comprising circuitry to:
   receive a memory address translation request message from a downstream connected device;
   identify, from the memory address translation request message, a permission indication that the device intends to perform a write access to one or more memory address locations specified in the memory address translation request message;
   identify, from an address translation and protection table (ATPT), a dirty bit value associated with the one or more memory address locations; and
   transmit a translation of the one or more memory address locations and a read or read+write permission to the device based on the permission indication in the memory address translation request message and the dirty bit.

2. The apparatus of claim 1, wherein the memory address translation request message comprises a translation request header associated with a Peripheral Component Interconnect Express (PCIe)-based address translation services (ATS) protocol.

3. The apparatus of claim 1, the apparatus comprising circuitry to:
   determine that the permission indication comprises a potential write bit set;
   determine that the dirty bit is set; and
   transmit a read+write permission to the device for the one or more memory address locations specified by the memory address translation request message.

4. The apparatus of claim 1, the apparatus comprising circuitry to:
   determine that the permission indication comprises a potential write bit set;
   determine that the dirty bit is clear; and
   transmit a read-only permission to the device for the one or more memory address locations specified by the memory address translation request message.

5. The apparatus of claim 1, the apparatus comprising circuitry to:
   determine that the permission indication comprises a potential write bit set;
   determine that a no-write bit is set; and
   transmit a read-only permission to the device for the one or more memory address locations specified by the memory address translation request message.

6. The apparatus of claim 1, the apparatus comprising circuitry to:
   determine that the permission indication comprises a potential write bit set;
   determine that a no-write bit is set; and
   transmit a read+write permission to the device for the one or more memory address locations specified by the memory address translation request message.

7. The apparatus of claim 1, wherein the apparatus comprises a translation agent.

8. A computer implemented method comprising:
   receiving, at a translation agent, a memory address translation request message from a downstream connected device;
   identifying, from the memory address translation request message, a permission indication that the device intends to perform a write access to one or more memory address locations specified in the memory address translation request message;
   identifying, from an address translation and protection table (ATPT), a dirty bit value associated with the one or more memory address locations; and
   transmitting a translation of the one or more memory address locations and a read or read+write permission to the device based on the permission indication in the memory address translation request message and the dirty bit.

9. The method of claim 8, wherein the memory address translation request message comprises a translation request header associated with a Peripheral Component Interconnect Express (PCIe)-based address translation services (ATS) protocol.

10. The method of claim 8, the method comprising:
   determining that the permission indication comprises a potential write bit set;
   determining that the dirty bit is set; and
   transmitting a read+write permission to the device for the one or more memory address locations specified by the memory address translation request message.

11. The method of claim 8, the method comprising:
   determining that the permission indication comprises a potential write bit set;
   determining that the dirty bit is clear; and
   transmitting a read-only permission to the device for the one or more memory address locations specified by the memory address translation request message.

12. The method of claim 8, the method comprising:
   determining that the permission indication comprises a potential write bit set;
   determining that a no-write bit is set; and
   transmitting a read-only permission to the device for the one or more memory address locations specified by the memory address translation request message.

13. The method of claim 8, the method comprising:
   determining that the permission indication comprises a potential write bit set;
   determining that a no-write bit is set; and
   transmitting a read+write permission to the device for the one or more memory address locations specified by the memory address translation request message.

14. A non-transitory computer-readable medium having program instructions stored therein, wherein the program instructions are executable by a computer system to perform operations comprising:
   receiving, at a translation agent, a memory address translation request message from a downstream connected device;
   identifying, from the memory address translation request message, a permission indication that the device intends to perform a write access to one or more memory address locations specified in the memory address translation request message;
   identifying, from an address translation and protection table (ATPT), a dirty bit value associated with the one or more memory address locations; and
   transmitting a translation of the one or more memory address locations and a read or read+write permission to the device based on the permission indication in the memory address translation request message and the dirty bit.

15. The non-transitory computer-readable medium of claim 14, wherein the memory address translation request message comprises a translation request header associated with a Peripheral Component Interconnect Express (PCIe)-based address translation services (ATS) protocol.

16. The non-transitory computer-readable medium of claim 14, the operations comprising:
   determining that the permission indication comprises a potential write bit set;
   determining that the dirty bit is set; and
   transmitting a read+write permission to the device for the one or more memory address locations specified by the memory address translation request message.

17. The non-transitory computer-readable medium of claim 14, the operations comprising:
   determining that the permission indication comprises a potential write bit set;
   determining that the dirty bit is clear; and
   transmitting a read-only permission to the device for the one or more memory address locations specified by the memory address translation request message.

18. The non-transitory computer-readable medium of claim 14, the operations comprising:
   determining that the permission indication comprises a potential write bit set;
   determining that a no-write bit is set; and
   transmitting a read-only permission to the device for the one or more memory address locations specified by the memory address translation request message.

19. The non-transitory computer-readable medium of claim 14, the operations comprising:
   determining that the permission indication comprises a potential write bit set;
   determining that a no-write bit is set; and
   transmitting a read+write permission to the device for the one or more memory address locations specified by the memory address translation request message.

20. A system comprising:
   a host system comprising:
      a translation agent, and
      an address translation and protection table; and
   an endpoint device coupled to the host system by a link based on a Peripheral Component Interconnect Express (PCIe) protocol, the endpoint device comprising:
      an address translation cache; and
      logic circuitry to:
         construct a translation request header that comprises one or more memory addresses for translation and an indication of a potential write access to the one or more memory addresses, and
         transmit the translation request header to the translation agent across link; and
   the translation agent comprising circuitry to:
      receive a memory address translation request message from a downstream connected device;
      identify, from the memory address translation request message, a permission indication that the device intends to perform a write access to one or more memory address locations specified in the memory address translation request message;
      identify, from an address translation and protection table (ATPT), a dirty bit value associated with the one or more memory address locations; and
      transmit a translation of the one or more memory address locations and a read or read+write permission to the device based on the permission indication in the memory address translation request message and the dirty bit.

21. The system of claim 20, wherein the memory address translation request message comprises a translation request header associated with a Peripheral Component Interconnect Express (PCIe)-based address translation services (ATS) protocol.

22. The system of claim 20, the translation agent comprising circuitry to:
   determine that the permission indication comprises a potential write bit set;
   determine that the dirty bit is set; and
   transmit a read+write permission to the device for the one or more memory address locations specified by the memory address translation request message.

23. The system of claim 20, the translation agent comprising circuitry to:
   determine that the permission indication comprises a potential write bit set;

determine that the dirty bit is clear; and transmit a read-only permission to the device for the one or more memory address locations specified by the memory address translation request message.

24. The system of claim 20, the translation agent comprising circuitry to:
    determine that the permission indication comprises a potential write bit set;
    determine that a no-write bit is set; and
    transmit a read-only permission to the device for the one or more memory address locations specified by the memory address translation request message.

25. The system of claim 20, the translation agent comprising circuitry to:
    determine that the permission indication comprises a potential write bit set;
    determine that a no-write bit is set; and
    transmit a read+write permission to the device for the one or more memory address locations specified by the memory address translation request message.

* * * * *